United States Patent
Zhang

(10) Patent No.: US 11,290,421 B2
(45) Date of Patent: Mar. 29, 2022

(54) GENERATION OF IPV6 MULTICAST ADDRESS

(71) Applicant: New H3C Technologies Co., Ltd., Hangzhou (CN)

(72) Inventor: Haihong Zhang, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 111 days.

(21) Appl. No.: 16/810,555

(22) Filed: Mar. 5, 2020

(65) Prior Publication Data

US 2021/0099420 A1    Apr. 1, 2021

(30) Foreign Application Priority Data

Sep. 30, 2019  (CN) .......................... 201910939895.8

(51) Int. Cl.
| | | |
|---|---|---|
| H04L 29/12 | (2006.01) | |
| H04L 12/18 | (2006.01) | |
| H04L 12/66 | (2006.01) | |
| H04L 61/5069 | (2022.01) | |
| H04L 61/5014 | (2022.01) | |
| H04L 101/659 | (2022.01) | |
| H04L 101/69 | (2022.01) | |

(52) U.S. Cl.
CPC ........ *H04L 61/2069* (2013.01); *H04L 12/185* (2013.01); *H04L 12/66* (2013.01); *H04L 61/2015* (2013.01); *H04L 61/609* (2013.01); *H04L 61/6059* (2013.01)

(58) Field of Classification Search
None
See application file for complete search history.

(56) References Cited

U.S. PATENT DOCUMENTS

| | | | | |
|---|---|---|---|---|
| 9,386,404 | B1* | 7/2016 | Emigh | H04N 21/242 |
| 2011/0261804 | A1* | 10/2011 | Antoine | H04L 61/303 |
| | | | | 370/342 |
| 2014/0297875 | A1* | 10/2014 | Cheng | H04L 61/103 |
| | | | | 709/226 |

(Continued)

FOREIGN PATENT DOCUMENTS

| | | |
|---|---|---|
| JP | H1093555 A | 4/1998 |
| JP | 2002290458 A | 10/2002 |

(Continued)

OTHER PUBLICATIONS

Kubo, T. et al., "A Proposal of Data Transfer Based on IPv6 Address with Geographical Information", Proceedings of the Multimedia, Distribution, Cooperation and Mobile Symposium (DICOMO 2004), Information Processing Society of Japan, Jul. 7, 2004, 19 pages.

(Continued)

*Primary Examiner* — Jay L Vogel
(74) *Attorney, Agent, or Firm* — McCoy Russell LLP

(57) ABSTRACT

A method and an apparatus for generating an Ipv6 multicast address are provided. The method includes: a client generates an IPv6 multicast address of a multicast group based on obtained location information of a target device. Further, after the client generates an IPv6 multicast address based on the location information, joins the multicast group based on the IPv6 multicast address, the client receives data from a multicast source to the multicast group.

16 Claims, 8 Drawing Sheets

(56) References Cited

U.S. PATENT DOCUMENTS

| | | | | |
|---|---|---|---|---|
| 2015/0078379 A1* | 3/2015 | Wijnands | ............... | H04L 12/18 370/390 |
| 2019/0149449 A1* | 5/2019 | Morris | ................... | H04L 45/02 709/238 |
| 2019/0230167 A1* | 7/2019 | Laari | ................... | H04L 61/1511 |
| 2020/0267068 A1* | 8/2020 | Johnsson | ............. | H04L 43/106 |

FOREIGN PATENT DOCUMENTS

| | | |
|---|---|---|
| JP | 2007312022 A | 11/2007 |
| WO | 2018182728 A1 | 10/2018 |

OTHER PUBLICATIONS

Japanese Patent Office, Office Action Issued in Application No. 2020-039135, dated Jun. 1, 2021, 5 pages.

Imielinski, T. et al., "GPS Based Addressing and Routing," Network Working Group Request for Comments: 2009, Category: Experimental, Internet Engineering Task Force Website, Available Online at https://tools.ietf.org/html/rfc2009, Nov. 1, 1996, 28 pages.

Jemaa, I. et al., "A Framework for IP and non-IP Multicast Services for Vehicular Networks," Proceedings of the 2012 Third International Conference on the Network of the Future, Nov. 21, 2012, Gammarth, Tunisia, 6 pages.

Kanemaru, Y. et al., "TrafficCam: sharing Traffic Information based on Dynamic IPv6 Multicast Group Assignment using Smartphone Sensors," Proceedings of the 10th Annual IEEE Consumer Communications and Networking Conference (CCNC), Jan. 11, 2013, Las Vegas, Nevada, 2 pages.

Dannheim, C. et al., "Geo-Based IPv6 Multicast in LTE for Dynamic Addressing of Road Users," Proceedings of the 2013 AFRICON, Sep. 9, 2013, Pointe-Aux-Piments, Mauritius, 4 pages.

Zhang, H. et al., "Coordinate-Based Dynamic IPV6 Multicast Addresses Allocation draft-zhang-coordinate-based-ipv6-multicast-00," Internet-Draft, Intended Status: Standards Track, Expires: May 26, 2020, Internet Engineering Task Force Website, Available Online at http://tools.ietf.org/html/draft-zhang-coordinate-based-ipv6-multicast-00, Nov. 23, 2019, 8 pages.

European Patent Office, Extended European Search Report Issued in Application No. 20161157.1, dated Jun. 17, 2020, Germany, 11 pages.

* cited by examiner

| ND_OPTION_Extern (140) | OptLen |
|---|---|
| Sub-option-type | Sub-option-len |
| Sub-option ||
| . ||
| . ||
| . ||
| Sub-option ||

FIG. 10A

| Option_GEOLOCATION | | | OptLen | | |
|---|---|---|---|---|---|
| LatUnc | Latitude | | | | |
| Lat (cont'd) | LongUnc | Longitude | | | |
| Longitude (cont'd) | | AType | AltUnc | Altitude | |
| Altitude (cont'd) | | | Ver | Res | Datum |

FIG. 10B

GENERATION OF IPV6 MULTICAST ADDRESS

CROSS REFERENCE TO RELATED APPLICATION

This patent application claims priority to the Chinese Patent Application No. 2019109398958 entitled "METHOD AND APPARATUS FOR GENERATING IPV6 MULTICAST ADDRESS" filed on Sep. 30, 2019, the entire content of which is incorporated herein by reference.

TECHNICAL FIELD

The present disclosure relates to the field of network communication, and more particularly, to a method and an apparatus for generating an IPv6 multicast address.

BACKGROUND

With continuous development of the Internet, the next-generation Internet based on IPv6 (Internet Protocol Version 6) protocol has been applied ever more widely. The next-generation Internet based on IPv6 protocol supports multi-casting (hereinafter referred to as IPv6 multicast).

In IPv6 multicast applications, a multicast source only needs to send a copy of data with an IPv6 multicast address as a destination address. Afterwards, routers in the network copy and forward the data based on distribution of members in a multicast group corresponding to the IPv6 multicast address, and accurately transmit the data to each member in the multicast group.

BRIEF DESCRIPTION OF DRAWINGS

The accompanying drawings, which are incorporated in and constitute a part of this specification, illustrate examples consistent with the disclosure and, together with the description, serve to explain the examples of the disclosure.

FIG. 10A is a schematic diagram illustrating a format of ND_OPTION_Extern (140) in an RA message according to an example of the present disclosure.

FIG. 10B is a schematic diagram illustrating a format of Sub_option_geolocation in an RA message according to an example of the present disclosure.

DETAILED DESCRIPTION

Figure 1:
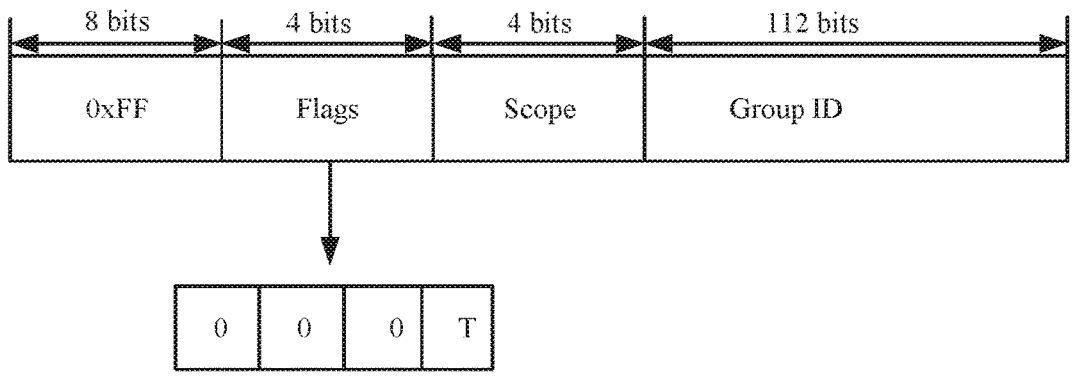
FIG. 1 is a schematic diagram illustrating a first IPv6 multicast address format according to some approaches of the present disclosure.
Figure 2:
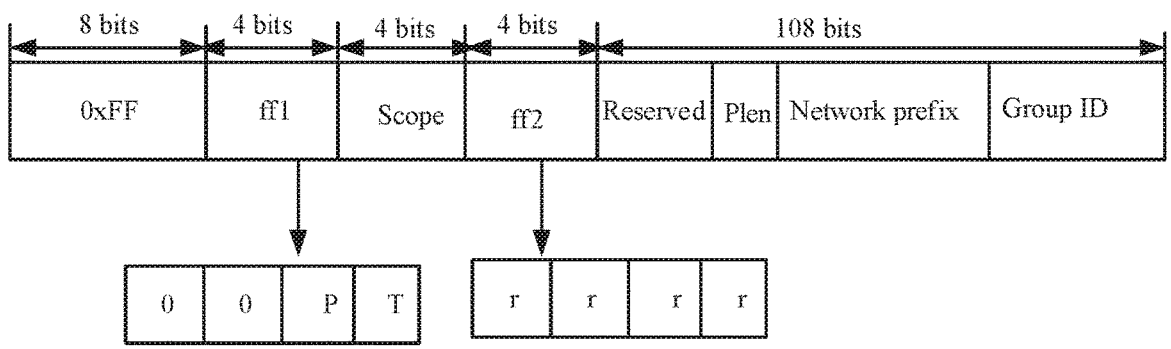
FIG. 2 is a schematic diagram illustrating a second IPv6 multicast address format according to some approaches of the present disclosure.
Figure 3:
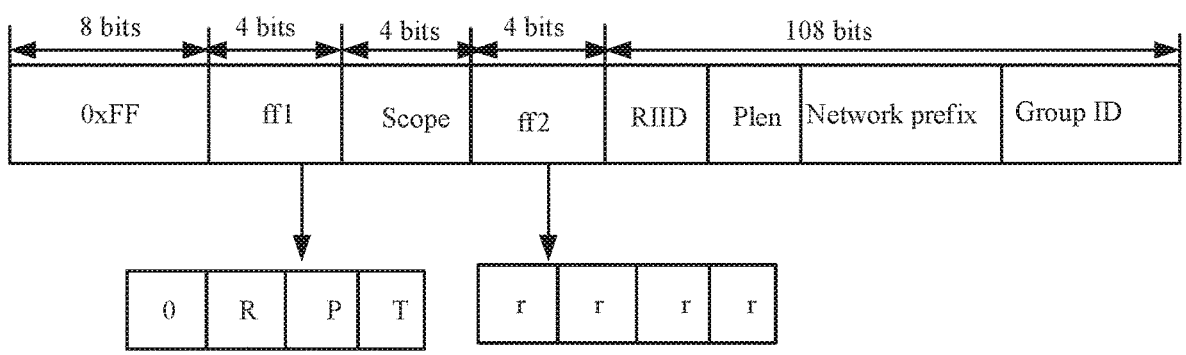
FIG. 3 is a schematic diagram illustrating a third IPv6 multicast address format according to some approaches of the present disclosure.

There are various formats of IPv6 multicast addresses. FIGS. 1 to 3 show examples of three different formats of IPv6 multicast addresses.

An IPv6 multicast address format shown in FIG. 1 is defined in RFC2373. In the IPv6 multicast address format shown in FIG. 1, each field is as follows.

0xFF indicates that this address is an IPv6 multicast address and occupies the highest 8 bits of the IPv6 multicast address, where the highest 8 bits are each set to a value 1.

A Flags field occupies 4 bits of the IPv6 multicast address, where the highest 3 bits in the Flags field are set to default values (for example, the value is "0" in FIG. 1), and the last bit (denoted by T in FIG. 1) in the Flags field indicates whether this IPv6 multicast address is temporarily or permanently allocated (or is a well-known group Broadcast address). In an example, when the value of T is 0, the IPv6 multicast address is permanently allocated (or a well-known multicast address); and when the value of T is 1, the IPv6 multicast address is temporarily allocated.

A Scope field occupies 4 bits of the IPv6 multicast address, where the Scope field identifies the application scope of the multicast group. The values and meanings of the Scope field are shown in Table 1.

TABLE 1

| Value | Meaning |
| --- | --- |
| 0, 3, F | reserved |
| 1 | interface-local scope |
| 2 | link-local scope |
| 4 | admin-local scope |
| 5 | site-local scope |
| 6, 7, 9, A~D | unassigned |
| 8 | organization-local scope |
| E | global scope |

A Group ID (Multicast Group Identifier) field occupies a lowest 112 bits of the IPv6 multicast address, and uniquely identifies a multicast group within the range identified by the Scope field.

An IPv6 multicast address format shown in FIG. 2 is defined in RFC7371 and is an IPv6 multicast address based on a network prefix. In the IPv6 multicast address format shown in FIG. 2, each field is as follows.

0xFF indicates that this address is an IPv6 multicast address, and occupies highest 8 bits of the IPv6 multicast address, where the highest 8 bits are each set to value 1.

A ff1 field occupies 4 bits of the IPv6 multicast address, where the two highest bits in the ff1 field are set to default values (for example, the value is "0" in FIG. 2), and the next bit (denoted by P in FIG. 2) indicates whether this IPv6 multicast address is a network prefix based multicast address. In an example, when the value of P is 1, the IPv6 multicast address is a network prefix based multicast address. When the value of P is 0, the IPv6 multicast address is not a network prefix based multicast address. The last bit in the ff1 field (denoted by T in FIG. 2) is similar to the last bit in the Flags field shown in FIG. 1, thus the ff1 field shown in FIG. 2 is also referred to as a Flags field. If the value of P is 1, the value of T is 1.

A Scope field occupies 4 bits of the IPv6 multicast address. The Scope field is similar to the Scope field shown in FIG. 1.

A ff2 field occupies 4 bits of the IPv6 multicast address. In FIG. 2, each bit in the ff2 field is set to "r". "r" indicates an additional flag bit for future assignment, and is sent as zero and is ignored when received.

A Reserved field occupies 4 bits of the IPv6 multicast address, and has the default value, for example, the value is "0".

A Plen field occupies 8 bits of the IPv6 multicast address, and indicates an effective length (counted in bits) of a network prefix.

A Network prefix field occupies 64 bits of the IPv6 multicast address, and indicates a network prefix of a subnet to which this IPv6 multicast address belongs.

A Group ID field occupies 32 bits of the IPv6 multicast address. Compared with FIG. 1, the length of the Group ID field is shortened, specifically shortened from the original 112 bits to 32 bits, but the meaning expressed by the Group ID field is still shown in the Group ID field shown in FIG. 1.

An IPv6 multicast address format shown in FIG. 3 is a format in which the address of the RP is embedded into the multicast address. The IPv6 multicast address format is defined in RFC7371. In the IPv6 multicast address format shown in FIG. 3, each field is as follows.

0xFF indicates that this address is an IPv6 multicast address and occupies highest 8 bits of the IPv6 multicast address, where the highest 8 bits are each set to value 1.

A ff1 field occupies 4 bits of the IPv6 multicast address. The highest bit in the ff1 field is set to the default value (for example, the value is "0" in FIG. 3), and the next bit (denoted by R in FIG. 3) indicates whether the IPv6 multicast address has a Rendezvous Point (RP) embedded in it. In an example, when the value of R is 0, it means that the IPv6 multicast address has no embedded RP, and when the value of R is 1, it means that the IPv6 multicast address has an embedded RP. P and T in the ff1 field shown in FIG. 3 are similar to those in the ff1 field shown in FIG. 2, respectively, thus the ff1 field shown in FIG. 3 is also referred to as a Flags field.

The Scope field, the ff2 field, the Plen field, the Network prefix field, and the Group ID field shown in FIG. 3 are similar to those fields shown in FIG. 2.

A RIID field shown in FIG. 3 occupies 4 bits and indicates an interface ID of a router of the RP.

The above describes the formats of the IPv6 multicast address currently used.

Based on the IPv6 multicast addresses in different formats described above, multicast can be implemented in IPv6.

Currently, IPv6 multicast addresses in various formats are irrelevant to location information. This also means that in IPv6, location-based multicast cannot be achieved, and it cannot meet the continuous advancement of the socialization of geographic information.

To achieve location-based multicast in IPv6, a method of generating an IPv6 multicast address based on location information is provided according to an example of the present disclosure. Location-based multicast can be realized via the IPv6 multicast address based on location information.

In order to make the objectives, technical solutions, and advantages of the examples of the present disclosure clearer, the following describes the examples of the present disclosure in detail with reference to the accompanying drawings and specific examples.

Figure 4:
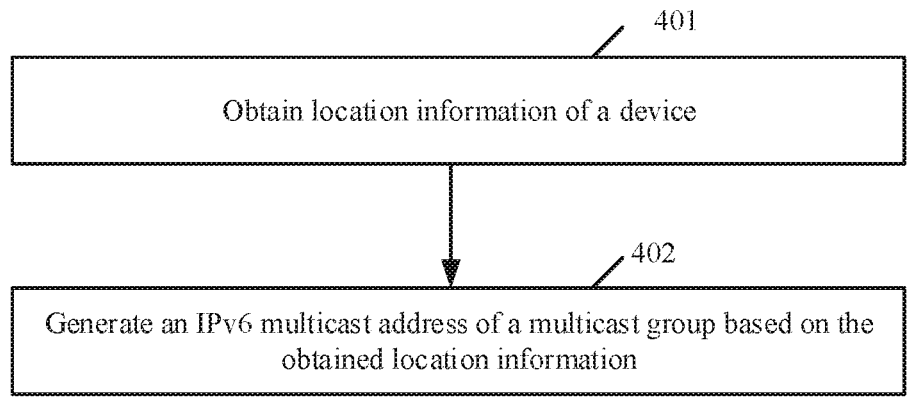
FIG. 4 is a flowchart illustrating generating an IPv6 multicast address according to an example of the present disclosure.

FIG. 4 is a flowchart of generating a first IPv6 multicast address according to an example of the present disclosure. The process is described from the client's perspective.

As shown in FIG. 4, the process may include steps 401 to 402.

At step 401, location information of a device is obtained.

The device herein is a previously designated device. For the convenience of description, the device is referred to as a target device. The target device will be described as follows.

In step 401, the location information of the target device includes many forms during specific implementation, such as latitude, longitude, and altitude information of the target device, and address information of the location where the target device is located, such as room XX on floor XX of building XX, which will not be specifically limited.

As for how the client obtains the location information of the target device in step 401, there are many modes in specific implementations, which will be described below.

At step 402, an IPv6 multicast address of the multicast group is generated based on the obtained location information.

The multicast group herein is a specific multicast group to be joined by a client.

Finally, in step 402, when the client needs to join a certain multicast group, the client actively generates an IPv6 multicast address of the multicast group based on the obtained location information of the target device. Then, the client joins the multicast group based on the generated IPv6 multicast address, and receives data from a multicast source to the multicast group, thereby realizing location-based multicast.

The following describes how to obtain the location information of the target device in step 401.

There are many implementations for obtaining the location information of the target device in step 401. Three embodiments are listed below as examples.

Embodiment 1

In Embodiment 1, the location information of the target device may be locally configured on the client in advance.

Based on this, in Embodiment 1, obtaining the location information of the target device may include: reading the location information of the target device from the local configuration. The local configuration means that a configuration file is configured on a device, for example, by downloading and/or storing the configuration file through software or hardware. In this example, the location information of the target device configured locally by the client refers to the location information of the target device that may be stored on the client through a software module or a hardware module by client itself or other devices.

Embodiment 2

In Embodiment 2, the step that the client obtains the location information of the target device may be performed during a process of the client obtaining an IP address (Internet Protocol address), which is described in detail below.

In Embodiment 2, the client is configured with a stateful address allocation mode locally. Under this premise, step 401 that the client obtains the location information of the target device may include: the client obtains the location information of the target device during a process of obtaining an IP address based on the stateful address allocation mode.

The Embodiment 2 is described in the following example.

In the example of the present disclosure, the stateful address allocation mode takes a DHCPv6 stateful address allocation mode as an example. During the process of obtaining an IP address in the DHCPv6 stateful address allocation mode, the client receives a DHCPv6 message from a DHCPv6 server. Compared with the conventional DHCPv6 message, the DHCPv6 message in the example of the present disclosure includes an OPTION_GEOLOCATION option, where the OPTION_GEOLOCATION option carries the location information of the target device.

Based on this, in Embodiment 2, the step that the client obtains the location information of the target device may include: the client receives a DHCPv6 message from a DHCPv6 server, where the OPTION_GEOLOCATION option of the DHCPv6 message carries the location information of the target device. After the client receives the DHCPv6 message from the DHCPv6 server, the client obtains the location information of the target device carried in the OPTION_GEOLOCATION option from the OPTION_GEOLOCATION option.

Figure 5:
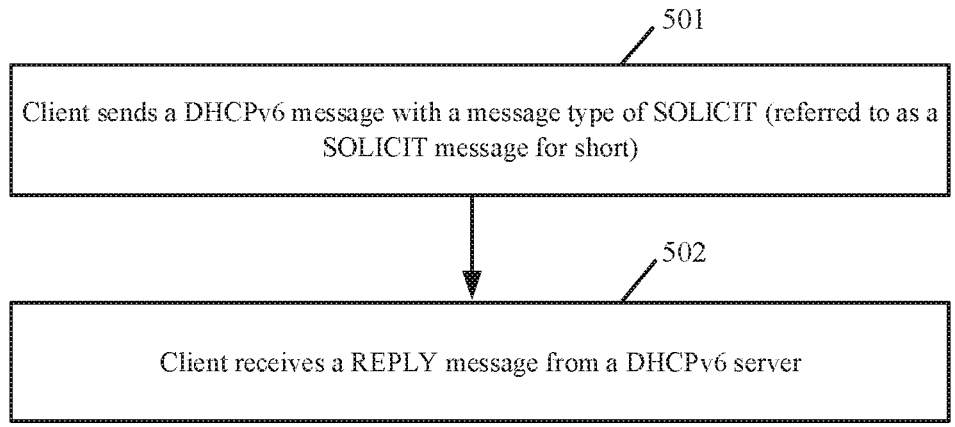
FIG. 5 is a first flowchart illustrating obtaining location information of a target device according to an example of the present disclosure.
Figure 9:
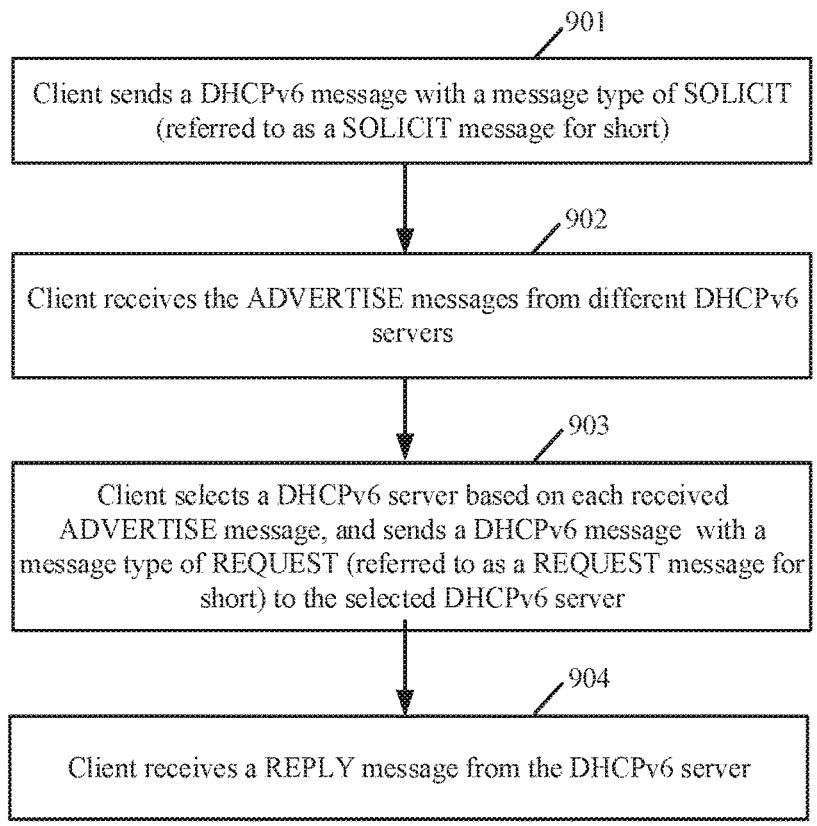
FIG. 9 is a second flowchart illustrating obtaining location information of a target device according to an example of the present disclosure.

The following describes how the client obtains the location information of the target device with reference to FIGS. 5 and 9 in conjunction with the process of the client obtaining the IP address.

FIG. 5 is a first flowchart illustrating a client obtaining location information of a target device according to an example of the present disclosure.

Before describing the process shown in FIG. 5, for ease of understanding, a format of a DHCPv6 message will be described first.

Figure 6:
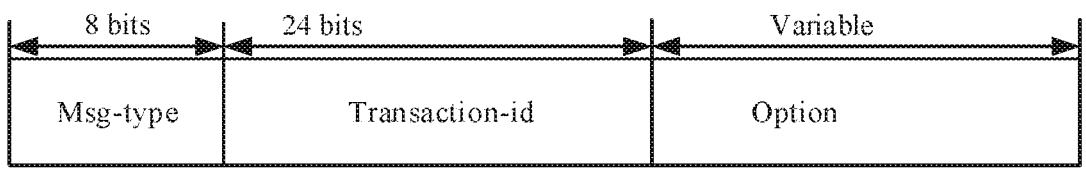
FIG. 6 is a schematic diagram illustrating a DHCPv6 message format according to an example of the present disclosure.

FIG. 6 shows a format of a DHCPv6 message. In the DHCPv6 message format shown in FIG. 6, each field is as follows.

A Msg-type field occupies 8 bits (1 byte), and indicates the message type. Table 2 shows each message type in detail.

TABLE 2

| Field | Length | Meaning |
| --- | --- | --- |
| Msg-type | 8 bits (1 byte) | message type: SOLICIT (1) ADVERTISE (2) REQUEST (3) CONFIRM (4) RENEW (5) REBIND (6) REPLY (7) RELEASE (8) DECLINE (9) RECONFIGURE (10) INFORMATION-REQUEST (11) RELAY-FORW (12) RELAY-REPL (13) |

A Transaction-id field occupies 24 bits (3 bytes) and indicates an interaction ID (also called a transaction ID). The interaction ID identifies a round-trip interaction for the DHCPv6 message. For example, a SOLICT message and an ADVERTISE message are in one interaction, and a REQUEST message and a REPLY message are in another interaction. The characteristics of the interaction ID are as follows. The interaction ID is a random value generated by the client; and the interaction ID is 0 if the DHCPv6 server initiates a session message.

Figure 7:
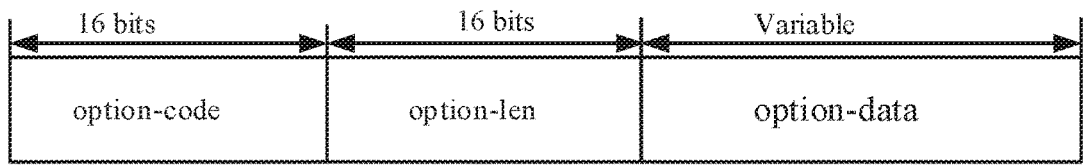
FIG. 7 is a schematic diagram illustrating a format of an Option field according to an example of the present disclosure.

An Option field is of a variable length. The Option field may contain configuration information allocated by the DHCPv6 server to the client, such as an IPv6 address of the DNS server. The Option field uses a TLV format. FIG. 7 illustrates the format of the Option field. Table 3 describes each field in the Option field format shown in FIG. 7.

TABLE 3

| Field | Length | Meaning |
| --- | --- | --- |
| option-code | 16 bits (2 bytes) | Unsigned integer, for identifying type of option: OPTION_CLIENTID (1): indicating identity of Client, for identifying Client; OPTION_SERVERID (2): for identifying DHCPv6 Server; OPTION_IA_NA (3): non-temporary address collection option; OPTION_IA_TA (4): temporary address collection option; OPTION_IAADDR (5): for carrying address option; |

TABLE 3-continued

| Field | Length | Meaning |
|---|---|---|
| | | OPTION_ORO (6): option requesting option, for identifying a series of options between Client and DHCPv6 Server; |
| | | OPTION_PREFERENCE (7); |
| | | OPTION_ELAPSED_TIME (8): Elapsed Time Option; |
| | | OPTION_RELAY_MSG (9): for transferring DHCP message between Relay-forward messages or Relay-reply messages; |
| | | OPTION_AUTH (11): Authentication Option; |
| | | OPTION_UNICAST (12): Server Unicast Option; |
| | | OPTION_STATUS_CODE (13): Status Code Option; |
| | | OPTION_RAPID_COMMIT (14): Rapid Commit Option; |
| | | OPTION_USER_CLASS (15): User Class Option; |
| | | OPTION_VENDOR_CLASS (16): Vendor Class Option; |
| | | OPTION_VENDOR_OPTS (17): Vendor-specific Information Option; |
| | | OPTION_INTERFACE_ID (18): for identifying user interface; |
| | | OPTION_RECONF_MSG (19): Reconfigure Message Option; |
| | | OPTION_RECONF_ACCEPT (20): Reconfigure Accept Option; |
| | | DNS Recursive Name Server (23); |
| | | DNS Domain Search List (24); |
| | | IA_PD (25): (Identity association for prefix delegation), authorized prefix set option; |
| | | IA_PD Prefix (26): for carrying prefix option; |
| | | Relay Agent Remote-ID (37); |
| | | Relay Agent Subscriber-ID (38); |
| | | AFTR Name (64): for carrying domain name of AFTR in DS-Lite scheme; |
| option-len | 16 bits (2 bytes) | Unsigned integer, indicating number of bytes in option-data field |
| option-data | Variable | Data part of option |

The DHCPv6 message is described above.

Based on the format of the DHCPv6 message described above, the process shown in FIG. 5 is described below.

As shown in FIG. 5, the process may include steps 501-502.

At step 501, the client sends a DHCPv6 message with a message type of SOLICIT (referred to as a SOLICIT message for short).

When the client obtains an IP address based on the DHCPv6 stateful address allocation mode, the client first sends a SOLICIT message to locate a DHCPv6 server that may provide services for the client. Compared with the SOLICIT message from the client in the related art, the SOLICIT message in step 501 includes an OPTION_ORO option, and the OPTION_ORO option carries instruction information which requests the location information of the target device. In an example, the format of the OPTION_ORO option is shown in FIG. 7, and the instruction information may be carried in the option-data shown in FIG. 7. In an example, the instruction information herein may be represented by a value specified in advance.

When the DHCPv6 server receives the SOLICIT message from the client, the DHCPv6 server determines that a Rapid-commit address function is enabled in local, and then returns a DHCPv6 message with a message type of REPLY (referred to as a REPLY message for short). Compared with a REPLY message from the DHCPv6 server in the related art, in the example of the present disclosure, the REPLY message from the DHCPv6 server includes an OPTION_GEOLOCATION option, where the OPTION_GEOLOCATION option carries the location information of the target device.

Figure 8:
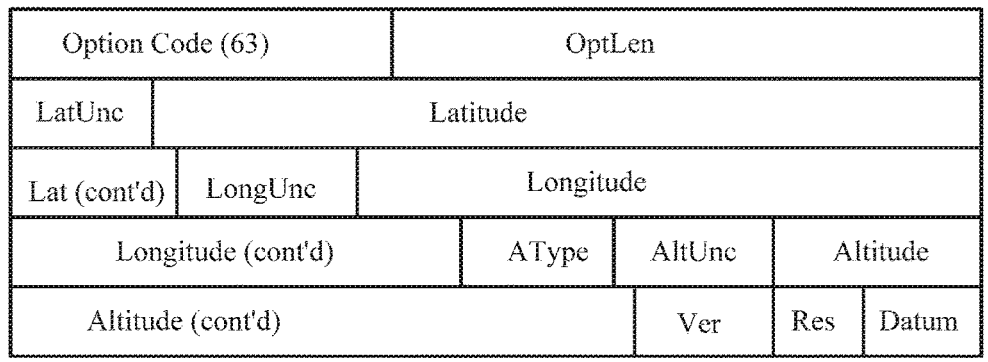
FIG. 8 is a schematic diagram illustrating a format of an OPTION_GEOLOCATION option in a DHCPv6 message according to an example of the present disclosure.

In an example, the location information of the target device may include: longitude information, latitude information, and altitude information. When the location information of the target device includes longitude information, latitude information, and altitude information, the format of the OPTION_GEOLOCATION option is a format of Geoloc Option defined by RFC6225, as shown in FIG. 8. The Option Code (63) shown in FIG. 8 occupies 16 bits and indicates an option code. In DHCPv6 stateful address allocation mode, an option code "63" represents Geoloc Option. As another example, the location information of the target device may also be other information than longitude information, latitude information, and altitude information, such as address information of the location where the target device is located, such as room XXXX, unit XXX, building XX, community X. In this case, the OPTION_GEOLOCATION option may be set with reference to FIG. 8, as long as the location information of the target device may be finally sent to the client. The examples of the present disclosure do not specifically limit how to set the OPTION_GEOLOCATION option.

At step 502, the client receives a REPLY message returned from the DHCPv6 server.

From above, the REPLY message includes an OPTION_GEOLOCATION option, where the OPTION_GEOLOCATION option carries the location information of the target device. In this way, when the client receives the REPLY message, the client may obtain the location information of the target device from the OPTION_GEOLOCATION option. Finally, in the process shown in FIG. 5, the client obtains the location information of the target device by receiving a DHCPv6 message (specifically, a REPLY message) from a DHCPv6 server during a process of obtaining an IP address.

As above, the process shown in FIG. 5 is described. Taking the DHCPv6 server locally enabling a Rapid-commit address function as an example, it is described how the client obtains the location information of the target device with reference to FIG. 5.

The following describes how to obtain the location information of the target device on the client, by taking disabling the Rapid-commit address function locally on the DHCPv6 server as an example.

FIG. 9 is a second flowchart illustrating a client obtaining location information of a target device according to an example of the present disclosure. FIG. 9 corresponds to the premise that the DHCPv6 server disables the Rapid-commit address function locally. Under this premise, as shown in FIG. 9, the process may include steps 901 to 904.

At step 901, the client sends a DHCPv6 message with a message type of SOLICIT (referred to as a SOLICIT message for short).

Step 901 is similar to step 501, which will not be described again.

When the DHCPv6 server receives the SOLICIT message and finds that the Rapid-commit address function is disabled locally, the DHCPv6 server returns a DHCPv6 message with a message type of ADVERTISE (referred to as an ADVERTISE message for short) to the client.

In the example of the present disclosure, compared with the ADVERTISE message from the DHCPv6 server in the related art, the ADVERTISE message from the DHCPv6 server includes an OPTION_GEOLOCATION option. The OPTION_GEOLOCATION option carries the location information of the target device. Here, the OPTION_GEOLOCATION option is shown in FIG. 8 and will not be repeated herein.

In a scenario where there are a plurality of DHCPv6 servers in the network, when each DHCPv6 server receives a SOLICIT message, the OPTION_GEOLOCATION option in the returned ADVERTISE message will carry the location information of the same target device.

At step 902, the client receives the ADVERTISE messages returned from different DHCPv6 servers.

As described above, the ADVERTISE message includes the OPTION_GEOLOCATION option, and the OPTION_GEOLOCATION option carries the location information of the target device. In this way, when the client receives the ADVERTISE message, the client may obtain the location information of the target device from the OPTION_GEOLOCATION option.

At step 903, the client selects one DHCPv6 server based on each received ADVERTISE message, and sends a DHCPv6 message with a message type of REQUEST (referred to as a REQUEST message for short) to the selected DHCPv6 server.

The ADVERTISE message from the DHCPv6 server carries the priority of the DHCPv6 server. In an example, step 903 that the client selects one DHCPv6 server based on each received ADVERTISE message may include: the client selects one DHCPv6 server with the highest priority, based on a priority of the DHCPv6 server carried in each received ADVERTISE message.

In an example, since the client has successfully obtained the location information of the target device in step 902, the client may not obtain the location information repeatedly in step 903. Here, the REQUEST message in step 903 may be similar to the conventional REQUEST message, and does not include the OPTION_ORO option which carries instruction information configured to request the location information of the target device.

In an example, in order to avoid some special situations, such as the location information of the target device being updated but the client not being able to know about that in time, the REQUEST message in step 903 needs to further include the OPTION_ORO option. The OPTION_ORO option carries instruction information configured to request location information of the target device.

When receiving a REQUEST message, the DHCPv6 server returns a DHCPv6 message with a message type of REPLY (referred to as a REPLY message for short).

In an example, if the REQUEST message includes an OPTION_ORO option and the OPTION_ORO option carries the following instruction information for requesting the location information of the target device, the REPLY message includes the OPTION_GEOLOCATION option, and the OPTION_GEOLOCATION option carries the location information of the target device. The OPTION_GEOLOCATION option herein is described above.

At step 904, the client receives a REPLY message returned from the DHCPv6 server.

If the REPLY message includes the OPTION_GEOLOCATION option, and the OPTION_GEOLOCATION option carries the location information of the target device, the client may obtain the location information of the target device from the OPTION_GEOLOCATION option. Finally, in the process shown in FIG. 9, the client obtains the location information of the target device by receiving a DHCPv6 message (such as an ADVERTISE message and a REPLY message) from a DHCPv6 server during the process of obtaining an IP address.

As above, the process shown in FIG. 9 is described, and further the Embodiment 2 is described.

For Embodiment 2, in an example, the target device may be a DHCPv6 server; in another example, the target device may be a previously designated device other than a DHCPv6 server, in this case, the DHCPv6 server needs to configure the location information of the target device locally.

Embodiment 3

For Embodiment 3, which is similar to Embodiment 2, the client obtains the location information of the target device during the process of the client obtaining an IP address. For Embodiment 3, different from Embodiment 2, the client is configured with a stateless address allocation mode locally.

In Embodiment 3, the step 401 above that the client obtains the location information of the target device may include: the client obtains the location information of the target device during the process of obtaining the IP address in a stateless address allocation mode.

Embodiment 3 is described in the following examples.

In the example of the present disclosure, the gateway device periodically sends a Router Advertisement (RA) message, and/or, the gateway device sends an RA message in response to the RS message after receiving a Router Solicitation (RS) message from the client.

Compared with the conventional RA message, the RA message in the example of the present disclosure additionally adds the location information of the target device. Based on this, in Embodiment 3, the client obtaining the location information of the target device in step 401 may include receiving an RA message from the gateway device, and the RA message includes the location information of the target device. When receiving the RA message from the gateway device, the client obtains the location information of the target device from the RA message.

In the example of the present disclosure, an option (marked as ND_OPTION_Extern (140)) may be added to the RA message. "140" indicates ND_OPTION_Extern, which is similar to the meaning indicated by 63 in Option Code (63) shown in FIG. 8.

Based on this, the location information of the target device may be carried in ND_OPTION_Extern (140).

In an example, the ND_OPTION_Extern (140) includes at least one Sub-option. FIG. 10A illustrates the structure of ND_OPTION_Extern (140). In the example of the present disclosure, the location information of the target device may be carried by one of the sub-options. For ease of description, the Sub-option carrying the location information of the target device may be recorded as Sub_option_geolocation. The remaining Sub-options may carry other information as required, which is not specifically limited in the present disclosure.

Based on this, the client may finally obtain the location information of the target device carried by the Sub_option_geolocation by parsing the Sub_option_geolocation of the RA message.

In an example, in Embodiment 3, the location information of the target device may include: longitude information, latitude information, and altitude information. When the location information of the target device includes longitude information, latitude information, and altitude information, the format of the Sub_option_geolocation is similar to the format of the Geoloc Option field shown in FIG. 8 defined by RFC6225, and FIG. 10B illustrates the format of the Sub_option_geolocation.

As another example, the location information of the target device may be other information than longitude information, latitude information, and altitude information, such as address information of the location where the target device is located. In this case, the Sub_option_geolocation in the RA message may be set with reference to FIG. 10B. As long as the location information of the target device may be finally sent to the client, the example of the present disclosure does not specifically limit how to set the Sub_option_geolocation.

As above, the Embodiment 3 is described. in Embodiment 3, in an example, the target device may be one of the gateway devices designated in advance; in another example, the target device may also be a previously designated device other than the gateway device, in this case, the gateway device needs to configure the location information of the target device locally in advance.

The following describes how the client generates an IPv6 multicast address of a multicast group based on the location information in step 402.

In an example, the step 402 that the client generates an IPv6 multicast address of the multicast group based on the location information may include: the client generates an IPv6 multicast address of the multicast group based on the location information of the target device and a multicast group ID of the multicast group. Here, the Group ID of the multicast group is configurable. For example, it may be pre-configured on the client.

Figure 11:
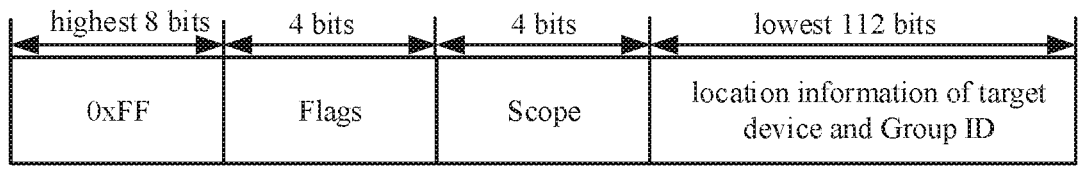
FIG. 11 is a schematic diagram illustrating an IPv6 multicast address format according to an example of the present disclosure.

FIG. 11 is a schematic diagram illustrating an IPv6 multicast address format according to an example of the present disclosure. In the IPv6 multicast address format shown in FIG. 11, the length of the entire IPv6 multicast address is 128 bits.

The highest 8 bits are each set to value 1 to form 0xFF, which indicates that this address is an IPv6 multicast address.

The lowest 112 bits are set based on the location information of the target device and the Group ID of the multicast group.

The 8 bits between the highest 8 bits and the lowest 112 bits are occupied by the Flags field and the Scope field.

The Flags field occupies 4 bits and is adjacent to the highest 8 bits. In the example of the present disclosure, one bit occupied by the Flags field (denoted by G in the example of the present disclosure) indicates whether the IPv6 multicast address is generated based on the location information of the target device.

The Scope field occupies 4 bits and is adjacent to the lowest 112 bits. The Scope field indicates the multicast scope. The Scope field herein is similar to the Scope field shown in FIG. 1 to FIG. 3 described above.

Figure 12:
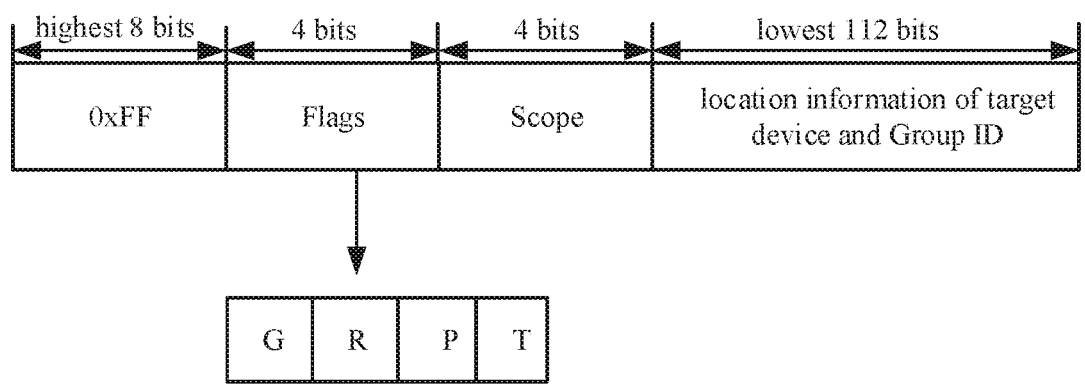
FIG. 12 is a schematic diagram illustrating a format of a Flags field according to an example of the present disclosure.

As shown in the IPv6 multicast address format shown in FIG. 3, it can be seen that the lowest three bits of the Flags field have been defined. Based on this, the example of the present disclosure may use the highest bit of the Flags field as the G to indicate whether the IPv6 multicast address is generated based on the location information of the target device. In an example, when the value of G is 1, the IPv6 multicast address is generated based on the location information of the target device; when the value of G is 0, the IPv6 multicast address is not generated based on the location information of the target device. The lowest three bits in the Flags field are as defined in RFC4291. FIG. 12 illustrates a format of a Flags field according to an example of the present disclosure.

In the example of the present disclosure, when G in the Flags field indicates that the IPv6 multicast address is generated based on the location information of the target device (for example, the value of G is 1), the IPv6 multicast address at this time is temporary. Therefore, when G in the Flags field indicates that the IPv6 multicast address is generated based on the location information of the target device (for example, the value of G is 1), T in the Flags field indicates that the IPv6 multicast address is temporarily allocated (for example, the value of T is 1).

In the example of the present disclosure, the location information of the target device may be converted into target location information conforming to the requirements of the IPv6 multicast address, and then the target location information and the Group ID are filled to the lowest 112 bits. The Group ID herein conforms to IPv6 multicast address requirements and may be expressed in hexadecimal.

Figure 13:
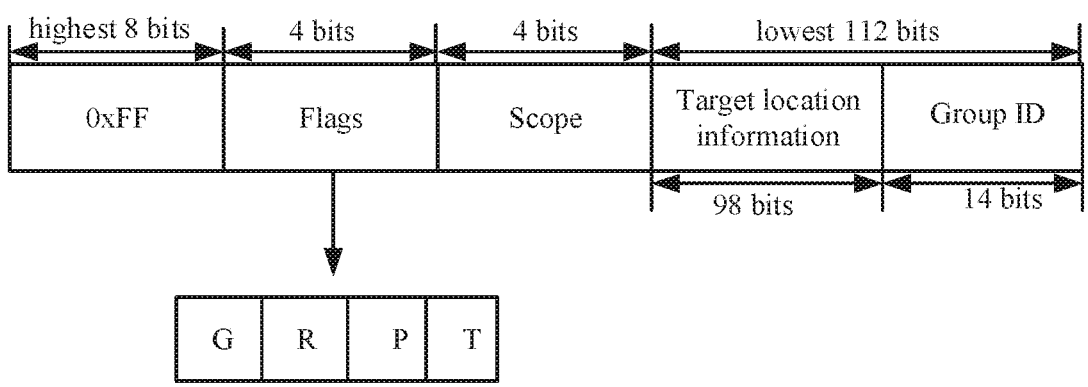
FIG. 13 is an example diagram illustrating an IPv6 multicast address format according to an example of the present disclosure.

In an example, for the lowest 112 bits, the target location information occupies the first 98 bits, and the Group ID occupies the remaining 14 bits. FIG. 13 illustrates an IPv6 multicast address format.

The following describes an example of converting the location information of the target device into target location information conforming to the requirements of an IPv6 multicast address.

In an example, when the location information of the target device includes: longitude information, latitude information, and altitude information, converting the location information of the target device into the target location information conforming to the requirements of the IPv6 multicast address may include: converting the longitude information, latitude information and altitude information of the target device into hexadecimal and arranging the result in a preset manner to obtain the target position information.

In another example, when the location information of the target device includes: longitude information, latitude information, and altitude information, converting the location information of the target device into target location information conforming to the requirements of the IPv6 multicast address may include: based on a first preset mapping relationship, determining data (such as hexadecimal data) having a mapping relationship with the longitude information, latitude information, and altitude information of the target device. The determined data include the target position information. The first mapping relationship herein may be set in advance based on actual needs, and the examples of the present disclosure are not specifically limited this.

In the example of the present disclosure, when the location information of the target device is other information than longitude information, latitude information, and altitude information, taking the address information of the location where the target device is located as an example, converting the location information of the target device into the target location information may include: searching for the target location information matching the location information of the target device in a national place name database code. The national place name database code is an encoding format for the place name database provided by a country, which was formulate based on the national standards "Code for the Administrative Division of the People's Republic of China" (GB2260), "Coding rules for Administrative Divisions below the County" (GB10114-88), "Coding rules for Civil Statistics" and "Coding rules for Classification and Categories of Place Names" (GB/T18521-2001).

Based on this, searching for the target location information matching the location information of the target device in a national place name database code may include: with the location information of the target device as a key word, searching for a code of the key word in the national place name database code, the code being the target location information that matches the location information of the target device. It should be noted that if the corresponding code is not searched out in the national place name database code based on the location information of the target device, another code for the location information closest to the location information of the target device may be selected. The selected code is also considered to be the target location information that matches the location information of the target device.

The above is a description of the method provided by the present disclosure from a client perspective.

The following describes the method provided by the present disclosure from the perspective of a network device.

When being applied to the network device side, the method of generating an IPv6 multicast address provided in the present disclosure may include: sending location information of a target device to a client. The location information of the target device is used by the client to generate an IPv6 multicast address for the multicast group. How the network device sends the location information of the target device to the client is described in the following two examples.

Example 1

Example 1 corresponds to Embodiment 2 described above. The description is as follows.

Figure 14:
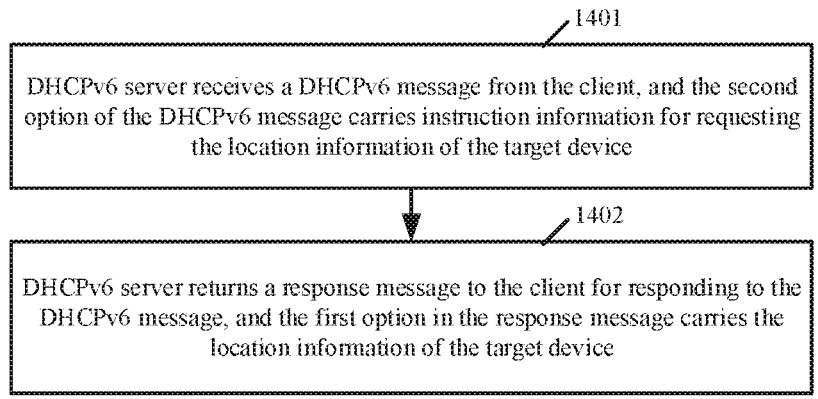
FIG. 14 is a flowchart illustrating a first implementation of sending location information of a target device by a network device according to an example of the present disclosure.

FIG. 14 is a flowchart illustrating a first implementation of sending location information of a target device by a network device according to an example of the present disclosure. In the process shown in FIG. 14, the network device is a DHCPv6 server.

As shown in FIG. 14, the process may include the following steps 1401 to 1402.

At step 1401, the DHCPv6 server receives a DHCPv6 message from the client, where the second option (i.e., OPTION_ORO) of the DHCPv6 message carries instruction information for requesting the location information of the target device.

As described at step 501, step 901, or step 903, the client sends a DHCPv6 message to the DHCPv6 server during the process of obtaining an IP address. Thus, the DHCPv6 server will receive the DHCPv6 message from the client. Taking the client sending a SOLICIT message at step 501 or step 901 described above as an example, the DHCPv6 server will receive the SOLICIT message from the client. The SOLICIT message is described in the process shown in FIG. 5 or FIG. 9.

At step 1402, the DHCPv6 server returns a response message to the client for responding to the DHCPv6 message, and the first option (i.e., OPTION_GEOLOCATION) in the response message carries the location information of the target device.

Still taking the client sending a SOLICIT message in step 501 or step 901 described above as an example, when the DHCPv6 message received by the DHCPv6 server is a SOLICIT message, if the DHCPv6 server finds that the Rapid-commit address function is locally enabled, the returned response message is a REPLY message. The REPLY message is described in the process shown in FIG. 5, and will not be repeated here. If the DHCPv6 server finds that the Rapid-commit address function is disabled locally, the returned response message is an ADVERTISE message. The ADVERTISE message is described in the process shown in FIG. 9 and will not be repeated here.

From the process shown in FIG. 14, it can be seen that the DHCPv6 server finally sends the location information of the target device to the client.

As above, the process shown in FIG. 14 is described. In the process shown in FIG. 14, as an example, the target device may be a DHCPv6 server. As another example, the target device is a previously designated device other than the DHCPv6 server, in this case, the DHCPv6 server needs to configure the location information of the target device locally in advance.

Example 2

Example 2 corresponds to Embodiment 3, and is described below.

Figure 15:
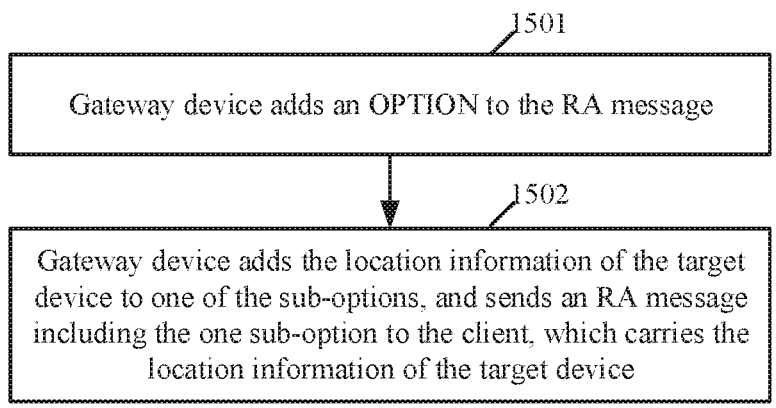
FIG. 15 is a flowchart illustrating a second implementation of a network device sending location information of a target device according to an example of the present disclosure.

FIG. 15 is a flowchart illustrating a second implementation of sending location information of a target device by a network device according to an example of the present disclosure. In the process shown in FIG. 15, the network device is a gateway device (for example, a router).

In the example of the present disclosure, the gateway device may send an RA message in response to the RS message to the client based on the RS message from the client.

In the example of the present disclosure, the gateway device may also periodically send RA messages.

When the gateway device sends an RA message, the process shown in FIG. 15 is performed.

At step 1501, the gateway device adds an OPTION to the RA message.

The OPTION is described in Embodiment 3, and recorded as ND_OPTION_Extern (140). As described in Embodiment 3, ND_OPTION_Extern (140) includes at least one Sub-option, as shown in FIG. 10A.

At step 1502, the gateway device adds the location information of the target device to one of the sub-options (recorded as Sub_option_geolocation) in ND_OPTION_Extern (140), and sends an RA message to the client, where the RA message includes the Sub_option_geolocation that carries the location information of the target device.

Here, the Sub_option_geolocation field is described in Embodiment 3 above, and will not be described again.

From the process shown in FIG. 15, it can be seen that the DHCPv6 server finally sends the location information of the target device to the client.

As above, the process shown in FIG. 15 is described.

In the illustrated process shown in FIG. 15, as an example, the target device is a gateway device. As another example, the target device is a previously designated device other than the gateway device, in this case, the gateway device needs to configure the location information of the target device locally in advance.

Figure 16:
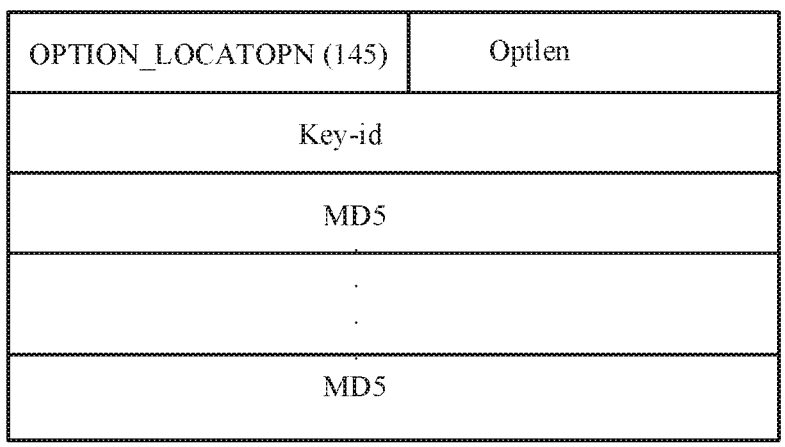
FIG. 16 is a schematic diagram illustrating encryption of location information according to an example of the present disclosure.

In order to reduce the risk of interception of the location information of the target device from the network device to the client, the network device may encrypt the location information of the target device. The encryption herein may be implemented by, for example, the MD5 algorithm. Taking the MD5 algorithm as an example, FIG. 16 illustrates a schematic diagram of encryption of location information of a target device. It should be noted that the type of PTION_LOCATOPN (145) is different from the aforementioned ND_OPTION_Extern (140), but its format may refer to the format of ND_OPTION_Extern (140), as shown in FIG. 16, and will not be repeated here.

Correspondingly, when the client receives the encrypted information (obtained by encrypting the location information of the target device), the client will decrypt the encrypted information based on the corresponding decryption strategy (pre-configured on the client), and finally obtain the location information of the target device.

As above, the method provided in the present disclosure is described.

The device provided in the present disclosure is described below.

Figure 17:
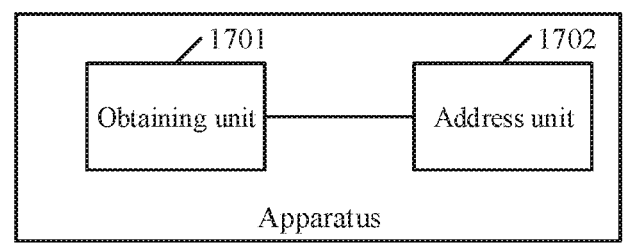
FIG. 17 is a block diagram illustrating an apparatus according to an example of the present disclosure.

FIG. 17 is a structure diagram illustrating an apparatus provided by the present disclosure. The apparatus is applied to a client. the apparatus includes an obtaining unit 1701 and an address unit 1702.

The obtaining unit 1701 is configured to obtain location information of a device.

The address unit 1702 is configured to generate an IPv6 multicast address of a multicast group based on the location information.

In an example, the obtaining unit 1701 is configured to obtain the location information of the device during a process of obtaining an IP address of the client.

In an example, the client obtains the IP address in a DHCPv6 stateful address allocation mode.

Based on this, the obtaining unit 1701 is configured to receive a DHCPv6 message including a first option (i.e., OPTION_GEOLOCATION) from a DHCPv6 server, where the first option carries the location information of the device.

In an example, the apparatus further includes a sending unit. The sending unit is configured to send a message including a second option (i.e., OPTION_ORO option) to the DHCPv6 server, where the second option carries instruction information for requesting the location information of the device.

In an example, the client obtains the IP address in a stateless address allocation mode.

Based on this, the obtaining unit 1701 is configured to receive a Router Advertisement (RA) message from a gateway device, where the RA message includes the location information of the device.

In an example, the location information of the device carries a sub-option in a third option (i.e., OPTION) included in the RA message.

In an example, the position information of the device includes: longitude information, latitude information, and altitude information; or, the position information of the device includes: address information of a location where the device is located.

In an example, the address unit 1702 is configured to: generate an IPv6 multicast address for the multicast group based on the location information and a multicast group identifier (i.e., Group ID) of the multicast group.

In an example, the IPv6 multicast address has a length of 128 bits.

The highest 8 bits are each set to value 1, the lowest 112 bits are set based on the location information and the Multicast group identifier, and 8 bits between the highest 8 bits and the lowest 112 bits are occupied by a Flags field and a Scope field.

The Flags field occupies 4 bits and is adjacent to the highest 8 bits. One bit occupied by the Flags field indicates that the IPv6 multicast address is generated based on the location information.

The Scope field occupies 4 bits, is adjacent to the lowest 112 bits, and indicates a multicast range.

In an example, the highest 1 bit of the Flags field indicates that the IPv6 multicast address is generated based on the location information.

In an example, when the highest 1 bit of the Flags field indicates that the IPv6 multicast address is generated based on the location information, the lowest 1 bit of the Flags field indicates that the IPv6 multicast address is temporarily allocated.

In an example, for the lowest 112 bits, the location information occupies the first 98 bits, and the Multicast group identifier occupies the remaining 14 bits.

As above, the structure of the apparatus shown in FIG. 17 is described.

Figure 18:
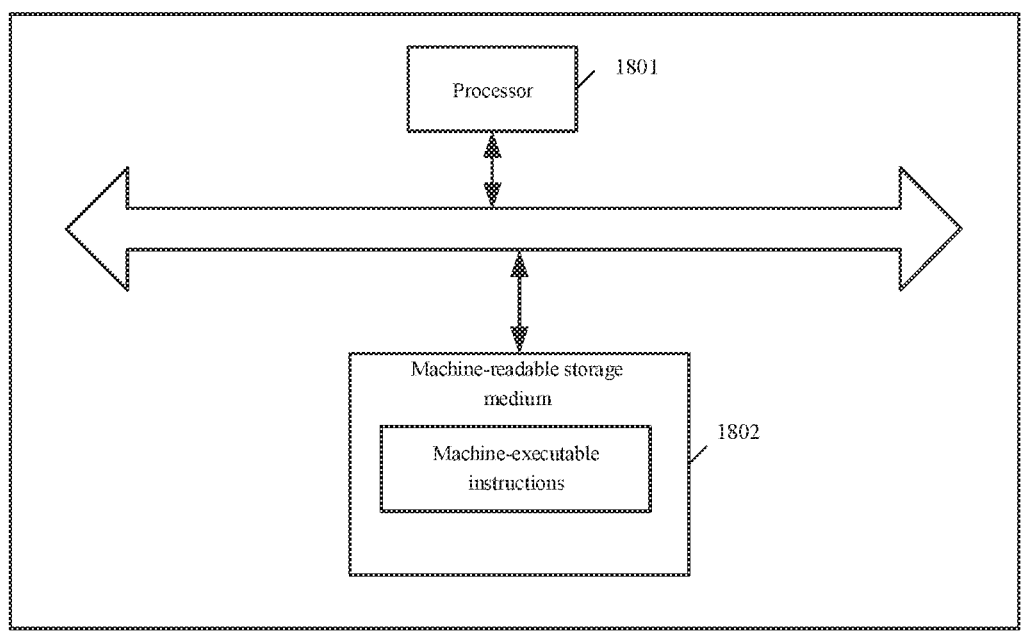
FIG. 18 is a block diagram illustrating hardware of the apparatus shown in FIG. 17 according to an example of the present disclosure.

The present disclosure also provides a hardware structure corresponding to the apparatus shown in FIG. 17. As shown in FIG. 18, the hardware structure includes: a processor 1801 and a machine-readable storage medium 1802, such as a non-transitory storage medium.

The machine-readable storage medium 1802 stores machine-executable instructions that may be executed by the processor 1801. The processor 1801 executes the machine-executable instructions to implement the method of generating an IPv6 multicast address shown in FIGS. 1 to 13 which is executed by a client.

The processor 1801 executes the machine-executable instructions to: obtain location information of a device; and generate an IPv6 multicast address of a multicast group based on the location information.

In an example, the processor 1801 executes the machine-executable instructions to: obtain the location information of the device during a process of obtaining an IP address of the client.

In an example, the client obtains the IP address in a DHCPv6 stateful address allocation mode; and the processor 1801 executes the machine-executable instructions to: receive a DHCPv6 message including a first option (i.e., OPTION_GEOLOCATION) from a DHCPv6 server, where the first option carries the location information of the device.

In an example, before receiving the DHCPv6 message, the processor 1801 executes the machine-executable instructions to: send a message including a second option (i.e., OPTION_ORO) to a DHCPv6 server, where the second option carries instruction information for requesting the location information of the device.

In an example, the client obtains the IP address in a stateless address allocation mode; the processor 1801 executes the machine-executable instructions to: receive a router advertisement RA message from a gateway device, where the RA message includes the location information of the device.

In an example, the location information of the device carries a sub-option in a third option (i.e., OPTION) included in the RA message.

In an example, the location information of the device includes longitude information, latitude information, and altitude information. Alternatively, the location information of the device includes address information of a location where the device is located.

In an example, the processor 1801 executes the machine-executable instructions to: generate an IPv6 multicast address of the multicast group based on the location information and a multicast group identifier (i.e., Group ID) of the multicast group.

In an example, the IPv6 multicast address has a length of 128 bits; in the IPv6 multicast address, the highest 8 bits are each set to value 1, the lowest 112 bits are set based on the location information and the multicast group identifier, and 8 bits between the highest 8 bits and the lowest 112 bits are occupied by a Flags field and a Scope field.

The Flags field occupies 4 bits and is adjacent to the highest 8 bits, one bit occupied by the Flags field indicates that the IPv6 multicast address is generated based on the location information; and the Scope field occupies 4 bits, is adjacent to the lowest 112 bits, and indicates a multicast range.

In an example, the highest 1 bit of the Flags field indicates that the IPv6 multicast address is generated based on the location information.

In an example, when the highest 1 bit of the Flags field indicates that the IPv6 multicast address is generated based on the location information, the lowest 1 bit of the Flags field indicates that the IPv6 multicast address is temporary allocated.

In an example, for the lowest 112 bits, the location information occupies the first 98 bits, and the multicast group identifier occupies the remaining 14 bits.

In the apparatus shown in FIG. 18, the processor 1801 may be a processor running instructions stored in a memory, or a processor of an application specific integrated circuit ASIC, or a combination of the two. Accordingly, the apparatus shown in FIG. 18 can be implemented by software, for example, instructions stored in a memory and executed by a processor. The processor 1801 can also be implemented by hardware, such as a processor of an application specific integrated circuit ASIC, or by both software and hardware together.

A machine-readable storage medium including instructions is provided according to an example of the present disclosure. For example, in the machine-readable storage medium 1802 in FIG. 18, the instructions may be executed by the processor 1801 to implement the method of generating an IPv6 multicast address described above.

Figure 19:
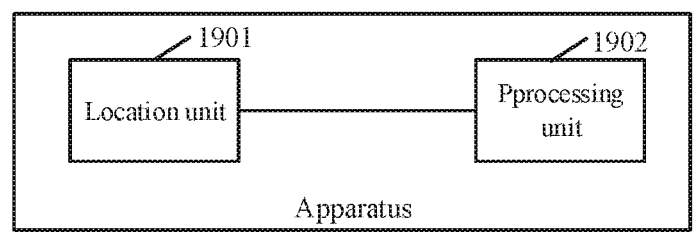
FIG. 19 is a block diagram of another apparatus according to an example of the present disclosure.

FIG. 19 is a structure diagram of another apparatus provided by the present disclosure. The apparatus is applied to a network device. The apparatus includes a location unit 1901 and a processing unit 1902.

The location unit 1901 is configured to obtain location information of a target device.

The processing unit 1902 is configured to send the location information of the target device obtained by the location unit 1901 to the client, where the location information of the target device is used by the client to generate an IPv6 multicast address of a multicast group based on the location information.

In an example, the network device is a DHCPv6 server.

Based on this, the apparatus further includes a receiving unit.

The receiving unit is configured to receive a DHCPv6 message from the client, where the DHCPv6 message includes a second option (i.e., OPTION_ORO), and the second option carries instruction information for requesting the location information of the target device.

Based on this, the processing unit 1902 is configured to return a response message for responding to the DHCPv6 message to the client, where the response message includes a first option (i.e., OPTION_GEOLOCATION), and the first option carries the location information of the target device.

In another example, the network device is a DHCPv6 server. Alternatively, the target device is a previously designated device other than the DHCPv6 server. In the case that the target device is a previously designated device other than the DHCPv6 server, the DHCPv6 server locally configures the location information of the target device.

In another example, the network device is a gateway device; and the processing unit 1902 is configured to: add a third option (i.e., OPTION) in an RA message, where the third option includes at least one sub-option (i.e., Sub-option); add the location information of the target device to one of the at least one sub-option of the third option; and send the RA message to the client.

In an example, the RA message is sent to the client based on the RS message from the client; or, the RA message is sent to the client periodically.

In an example, the target device is a gateway device; or the target device is a previously designated device other than the gateway device. In the case that the target device is a previously designated device other than the gateway device, the gateway device locally configures the location information of the target device.

In an example, the location information of the target device includes: longitude information, latitude information, and altitude information; or the location information of the target device includes: address information of a location where the target device is located.

As above, the structure of the device shown in FIG. 19 is described.

Figure 20:
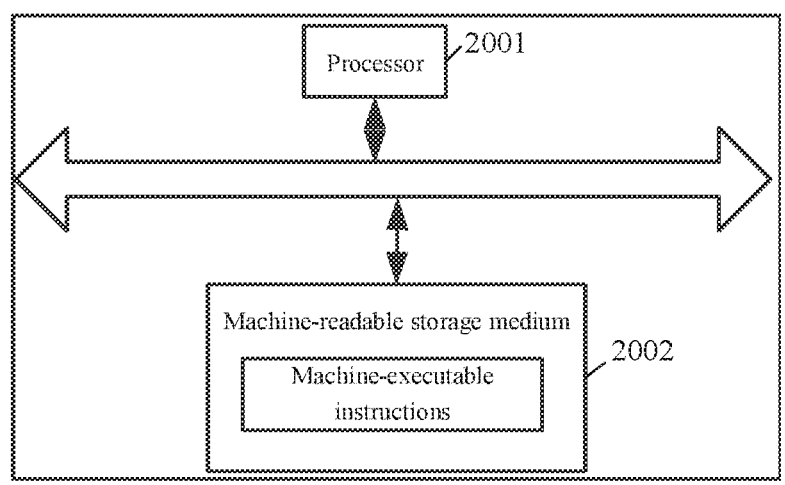
FIG. 20 is a block diagram illustrating hardware of the apparatus shown in FIG. 19 according to an example of the present disclosure.

The present disclosure also provides a hardware structure corresponding to the device shown in FIG. 19. This hardware structure is similar to that shown in FIG. 18. As shown in FIG. 20, the hardware structure includes: a processor 2001, and a machine-readable storage medium 2002, such as a non-transitory storage medium.

The machine-readable storage medium 2002 stores machine-readable instructions that may be executed by the processor 2001. The processor 2001 executes machine-executable instructions to implement the method of generating an IPv6 multicast address shown in FIGS. 14 to 15 which is executed by a network device.

The processor 2001 executes the machine-executable instructions to: send location information of a target device to a client, where the location information of the target device is used by the client to generate an IPv6 multicast address of a multicast group based on the location information.

In an example, the network device is a DHCPv6 server; the processor 2001 executes the machine-executable instructions to: receive a DHCPv6 message from a client, where the DHCPv6 message includes a second option (i.e., OPTION_ORO), and the second option carries instruction information for requesting the location information of the target device; returning a response message for responding to the DHCPv6 message to the client, where the response message includes a first option (i.e., OPTION_GEOLOCATION), and the first option carries the location information of the target device.

In an example, the target device is one of the following devices: a DHCPv6 server; and, a previously designated device other than the DHCPv6 server. In the case that the target device is a previously designated device other than the DHCPv6 server, the DHCPv6 server locally configures the location information of the target device.

In an example, the network device is a gateway device; the processor 2001 executes machine-executable instructions to: add a third option (i.e., OPTION) to an RA message, where the third option includes at least one sub-option (i.e., Sub-option); add the location information of the target device to one of the at least one sub-option of the third option; and send the RA message to the client.

In an example, the RA message is sent to the client based on a router solicitation RS message from the client; or the RA message is sent to the client periodically.

In an example, the target device is a gateway device; or the target device is a previously designated device other than the gateway device. In the case that the target device is a previously designated device other than the gateway device, the gateway device locally configures the location information of the target device.

In an example, the location information of the target device includes: longitude information, latitude information, and altitude information; or, the location information of the target device includes: address information of a location where the target device is located.

In the apparatus shown in FIG. 20, the processor 2001 may be a processor running instructions stored in a memory, or a processor of an application specific integrated circuit ASIC, or a combination of the two. Accordingly, the device shown in FIG. 20 may be implemented by software, for example, instructions stored in a memory and executed by a processor. The processor 2001 may also be implemented by hardware, such as a processor of an application specific integrated circuit ASIC, or by software and hardware together.

A machine-readable storage medium including instructions is provided according to an example of the present disclosure. For example, in the machine-readable storage medium 2002 in FIG. 20, the instructions may be executed by the processor 2001 to implement the IPv6 multicast address generation method described above.

In an example, the machine-readable storage medium may be any electronic, magnetic, optical, or other physical storage apparatus, and may contain or store information, such as executable instructions, data, and so on. For example, the machine-readable storage medium may be: RAM (Radom Access Memory), volatile memory, non-volatile memory, flash memory, storage drive (such as hard drive), solid state hard disk, any type of storage disk (Such as optical discs, DVDs, etc.), or similar storage media, or a combination of them.

The apparatus examples described above are only schematic, and the modules described as separate components may or may not be physically separated, and the components displayed as modules may or may not be located on one physical hardware or may be distributed to multiple physical hardware, and some or all of them may be selected according to actual needs to achieve the purpose of the solution of the present disclosure.

The above are only preferred examples of the present disclosure, and are not intended to limit the present disclosure. Any modification, equivalent replacement, or improvement made within the spirit and principles of the present disclosure shall be included in the protection scope of the present disclosure.

The invention claimed is:

1. A method of generating an IPv6 multicast address, the method being applied to a client, comprising:
   obtaining location information of a device; and
   generating the IPv6 multicast address of a multicast group based on the location information;
   wherein generating the IPv6 multicast address of the multicast group based on the location information comprises:
   generating the IPv6 multicast address of the multicast group based on the location information and a multicast group identifier of the multicast group,
   wherein the IPv6 multicast address has a length of 128 bits;
   in the IPv6 multicast address,
   the highest 8 bits are each set to value 1, the lowest 112 bits are set based on the location information and the multicast group identifier, and 8 bits between the highest 8 bits and the lowest 112 bits are occupied by a Flags field and a Scope field;
   the Flags field occupies 4 bits and is adjacent to the highest 8 bits, one of the 4 bits is set a value to indicate that the IPv6 multicast address is generated based on the location information; and
   the Scope field occupies 4 bits, is adjacent to the lowest 112 bits, and indicates a multicast range,
   the highest 1 bit of the Flags field is set a value to indicate that the IPv6 multicast address is generated based on the location information;
   the lowest 1 bit of the Flags field is set a value to indicate that the IPv6 multicast address is temporary allocated,
   for the lowest 112 bits, the location information occupies the first 98 bits, and the multicast group identifier occupies the remaining 14 bits.

2. The method of claim 1, wherein obtaining the location information of the device comprises:
   during a process of obtaining an IP address of the client, obtaining the location information of the device.

3. The method of claim 2, wherein the client obtains the IP address in a DHCPv6 stateful address allocation mode; obtaining the location information of the device comprises:
   receiving a DHCPv6 message including a first option from a DHCPv6 server, wherein the first option carries the location information of the device.

4. The method of claim 3, wherein before receiving the DHCPv6 message, further comprising:

sending a message comprising a second option to the DHCPv6 server, wherein the second option carries instruction information for requesting the location information of the device.

5. The method of claim 1, wherein the client obtains the IP address in a stateless address allocation mode;
obtaining the location information of the device comprises:
receiving a router advertisement (RA) message from a gateway device, wherein the RA message comprises the location information of the device.

6. The method of claim 5, wherein the location information of the device carries a sub-option in a third option included in the RA message.

7. The method of claim 1, wherein the location information of the device comprises one of following information:
longitude information, latitude information, and altitude information; and
address information of a location where the device is located.

8. A client, comprising:
a processor; and
a machine-readable storage medium storing instructions that are executed by the processor,
wherein the processor executes the instructions to implement the method of generating an IPv6 multicast address of claim 1.

9. A method of generating an IPv6 multicast address, the method being applied to a network device, comprising:
sending location information of a target device to a client, wherein the location information of the target device is used by the client to generate an IPv6 multicast address of a multicast group based on the location information;
wherein generating the IPv6 multicast address of the multicast group based on the location information comprises:
generating the IPv6 multicast address of the multicast group based on the location information and a multicast group identifier of the multicast group,
wherein the IPv6 multicast address has a length of 128 bits;
in the IPv6 multicast address,
the highest 8 bits are each set to value 1, the lowest 112 bits are set based on the location information and the multicast group identifier, and 8 bits between the highest 8 bits and the lowest 112 bits are occupied by a Flags field and a Scope field;
the Flags field occupies 4 bits and is adjacent to the highest 8 bits, one of the 4 bits is set a value to indicate that the IPv6 multicast address is generated based on the location information; and
the Scope field occupies 4 bits, is adjacent to the lowest 112 bits, and indicates a multicast range,
the highest 1 bit of the Flags field is set a value to indicate that the IPv6 multicast address is generated based on the location information;
the lowest 1 bit of the Flags field is set a value to indicate that the IPv6 multicast address is temporary allocated,
for the lowest 112 bits, the location information occupies the first 98 bits, and the multicast group identifier occupies the remaining 14 bits.

10. The method of claim 9, wherein the network device is a DHCPv6 server;
before sending the location information of the target device to the client, the method further comprises:
receiving a DHCPv6 message from the client, wherein the DHCPv6 message comprises a second option, and the second option carries instruction information for requesting the location information of the target device; and
sending the location information of the target device to the client comprises:
returning a response message for responding to the DHCPv6 message to the client, wherein the response message comprises a first option, and the first option carries the location information of the target device.

11. The method of claim 10, wherein the network device is one of:
the DHCPv6 server; and,
a previously designated device other than the DHCPv6 server, wherein the DHCPv6 server locally configures the location information of the target device.

12. The method of claim 9, wherein the network device is a gateway device; sending the location information of the target device to the client comprises:
adding a third option in a router advertisement (RA) message; wherein the third option comprises at least one sub-option;
adding the location information of the target device to one of the at least one sub-option of the third option; and
sending the RA message to the client.

13. The method of claim 12, wherein the RA message is sent to the client based on a router solicitation (RS) message from the client; or
the RA message is sent to the client periodically.

14. The method of claim 12, wherein the network device is one of:
the gateway device; and
a previously designated device other than the gateway device, wherein the gateway device locally configures the location information of the target device.

15. The method of claim 9, wherein the location information of the target device comprises one of following information:
longitude information, latitude information, and altitude information; and,
address information of a location where the target device is located.

16. A network device, comprising:
a processor; and
a machine-readable storage medium storing instructions that are executed by the processor,
wherein the processor executes the instructions to implement the method of generating an IPv6 multicast address of claim 9.

* * * * *